(12) United States Patent
Nitta et al.

(10) Patent No.: US 11,841,909 B2
(45) Date of Patent: Dec. 12, 2023

(54) TEXT ANALYTICS VIEWS FOR WEB SITE SOURCES

(71) Applicant: INTERNATIONAL BUSINESS MACHINES CORPORATION, Armonk, NY (US)

(72) Inventors: Keisuke Nitta, Koshigaya (JP); Daiki Tsuzuku, Kawasaki (JP); Tohru Hasegawa, Tokyo (JP); Shunsuke Ishikawa, Tokyo (JP); Yasumasa Kajinaga, Funabashi (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/650,706

(22) Filed: Feb. 11, 2022

(65) Prior Publication Data

US 2023/0259561 A1    Aug. 17, 2023

(51) Int. Cl.
*G06F 16/951* (2019.01)
*G06F 16/957* (2019.01)
(Continued)

(52) U.S. Cl.
CPC .......... *G06F 16/951* (2019.01); *G06F 16/906* (2019.01); *G06F 16/953* (2019.01);
(Continued)

(58) Field of Classification Search
CPC .... G06F 40/151; G06F 40/14; G06F 16/9577; G06F 16/906; G06F 16/953; G06F 16/951
See application file for complete search history.

(56) References Cited

U.S. PATENT DOCUMENTS 9,146,994 B2    9/2015  Emanuel
9,767,211 B2    9/2017  Cai
(Continued)

FOREIGN PATENT DOCUMENTS

DE    112018006438 T5    9/2020

OTHER PUBLICATIONS

IBM, "Example: Exploring the intersection of two facets—IBM Documentation," IBM Watson Explorer, [accessed Dec. 13, 2021], 3 pgs., Retrieved from the Internet: <https://www.ibm.com/docs/en/watson-explorer/12.0.x?topic=pairs-example-exploring-intersection-two-facets>.

(Continued)

*Primary Examiner* — Scott T Baderman
*Assistant Examiner* — Seung Woon Jung
(74) *Attorney, Agent, or Firm* — Andre Adkins (57) ABSTRACT

A method, computer system, and a computer program for analyzing a webpage content is provided. The present invention may include receiving a plurality of terms, including a plurality of structural information, derived from one or more responses to a faceted search query. The present invention may also include extracting a plurality of facet values from the plurality of terms. The present invention may then include generating an analysis of each facet value of the plurality of facet values. The present invention may further include determining a type of each facet value of the plurality of facet values based on the analysis. The present invention may also include generating an optimized web site mode interface including the analysis and displaying the optimized web site mode interface to a user.

19 Claims, 8 Drawing Sheets

(51) Int. Cl.
*G06F 40/151* (2020.01)
*G06F 16/906* (2019.01)
*G06F 40/14* (2020.01)
*G06F 16/953* (2019.01)
*G06F 16/958* (2019.01)

(52) U.S. Cl.
CPC ........ *G06F 16/9577* (2019.01); *G06F 16/986* (2019.01); *G06F 40/14* (2020.01); *G06F 40/151* (2020.01)

(56) References Cited

U.S. PATENT DOCUMENTS

| | | | |
|---|---|---|---|
| 10,242,103 B2 | 3/2019 | Bivens | |
| 2011/0125800 A1* | 5/2011 | Seager | G06F 16/2291 707/E17.104 |
| 2013/0298050 A1 | 11/2013 | Emanuel | |
| 2022/0107984 A1* | 4/2022 | Reed | G06Q 30/0224 |

OTHER PUBLICATIONS

Mell et al., "The NIST Definition of Cloud Computing", National Institute of Standards and Technology, Special Publication 800-145, Sep. 2011, pp. 1-7.

Smith, et al., "FacetMap: A Scalable Search and Browse Visualization," IEEE Transactions on Visualization and Computer Graphics, vol. 12, No. 5, Sep./Oct. 2006, pp. 797-804, <https://ieeexplore.ieee.org/abstract/document/4015432>.

* cited by examiner

TEXT ANALYTICS VIEWS FOR WEB SITE SOURCES

BACKGROUND

The present invention relates generally to the field of computing, and more particularly to electronic content analysis.

Content mining pertains to filtering through text within data available from various computerized sources to acquire insight useful for various purposes as discussed herein. Various crawlers are utilized to accumulate data available from accessible URLs. However, substantial amounts of waste information are acquired during the accumulation stage that are not only undesirable, but also negatively impact the calculations associated with the mining target. The mixing of the accumulated data increases the difficulty in distinguishing between desired data and undesired data because if there is no significant difference in numbers of appearances in any keywords then there is no correlation value. As a result, useful information including correlations cannot be accurately obtained for the searched term.

SUMMARY

According to one exemplary embodiment, a method for analyzing a webpage content is provided. A computer receives a plurality of terms, including a plurality of structural information, derived from one or more responses to a faceted search query. The computer extracts a plurality of facet values from the plurality of terms, then the computer generates an analysis of each facet value of the plurality of facet values. The computer determines a type of each facet value of the plurality of facet values based on the analysis, then the computer generates an optimized web site mode interface including the analysis, and displays the optimized web site mode interface to a user. A computer system, a computer program product, and a content analysis system corresponding to the above method are also disclosed herein.

In another aspect, a method for generating a plurality of "web site" modes including various text analysis views associated with the aforementioned computer program product is provided. One "web site" mode of the plurality of display modes is a Cascading Style Sheets (CSS) mode in which the computer is configured to extract the plurality of facet values, detect a first class attribute value and a second class attribute of the plurality of facet values, and classify the type of the particular facet value based on the first class attribute value not being equal to the second class attribute value. Another "web site" mode of the plurality of display modes is an Xpath mode in which the computer is configured to detect a first Xpath expression and a second Xpath expression, and classify the type of the particular facet value based on the first Xpath position not being equal to the second Xpath position.

In another aspect, a method of increasing efficiency of extracting facet values is provided. A computer generates an index of the webpage content in which the CSS name and/or Xpath expression of each of the plurality of terms is stored in the index along with location information pertaining to the particular term allowing facet values to be calculated/ascertained by referencing the location within the index.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

In response to the challenges presented by the excess accumulation of data by content mining, presented herein is a system, method, and computer program directed to analyzing a webpage content in a manner that results in not only discernment between desired and undesired text content within the webpage content, but also increases efficiency and accuracy of results of faceted searches. In addition, the systems and methods provided herein improve computing performance by calculating facet values for a source being mined without requiring dynamic searching. References to locations of query terms within a novel facet value index allow servers to reduce computing time and resources by not having to search expressions of facet values.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, computer program product, and web content analysis system for enhanced text analytics views for web site sources. Web crawlers/spider applications are utilized to collect and index content from various information sources (e.g., web servers, binary data, a JavaScript file, a CSS file, HTML pages, etc.) for various purposes such as augmenting suggestions when displaying search results to end users. In particular, in embodiments of the invention, the analysis of data acquired during this collection stage is useful for improving faceted searches which are the prevailing user tool for handling semi-structured data, continuous dimensions, and folksonomies. Facets are multiple explicit dimensions corresponding to various properties of the information source (e.g. title, size, type, etc.). Each property may include one or more property instances referred to as "facet values", which are useful to the user for text analytics purposes. However, web crawlers acquire data in a single document in an accumulative manner and the analysis performed on flat texts (e.g., files including unorganized records) is significantly less useful than the analysis on non-flat texts (e.g., XML files, etc.) for facet value evaluation purposes. This results in not only a lack of distinction between desirable text and undesirable text, but more importantly the mass accumulation of undesirable text negatively impacts the calculation of correlation values and renders unnecessary facet values that impact the search results. Improvements in textual analysis will increase the quality of search results especially when pertaining to faceted searches because correlation values will not be applied/associated with undesirable text and facet values will not be misconstrued. The present embodiments provide a system that includes mechanisms configured to generate a web site mode that distinguishes between facet values using Xpath positions and CSS class names within text. In addition, the present embodiments achieve mechanisms to index documents in a manner that reduces the amount of processing time and required computing resources by preventing dynamic searching of CSS/Xpath expressions of facet values that would otherwise require significant time and computing resources during a document query.

Figure 1:
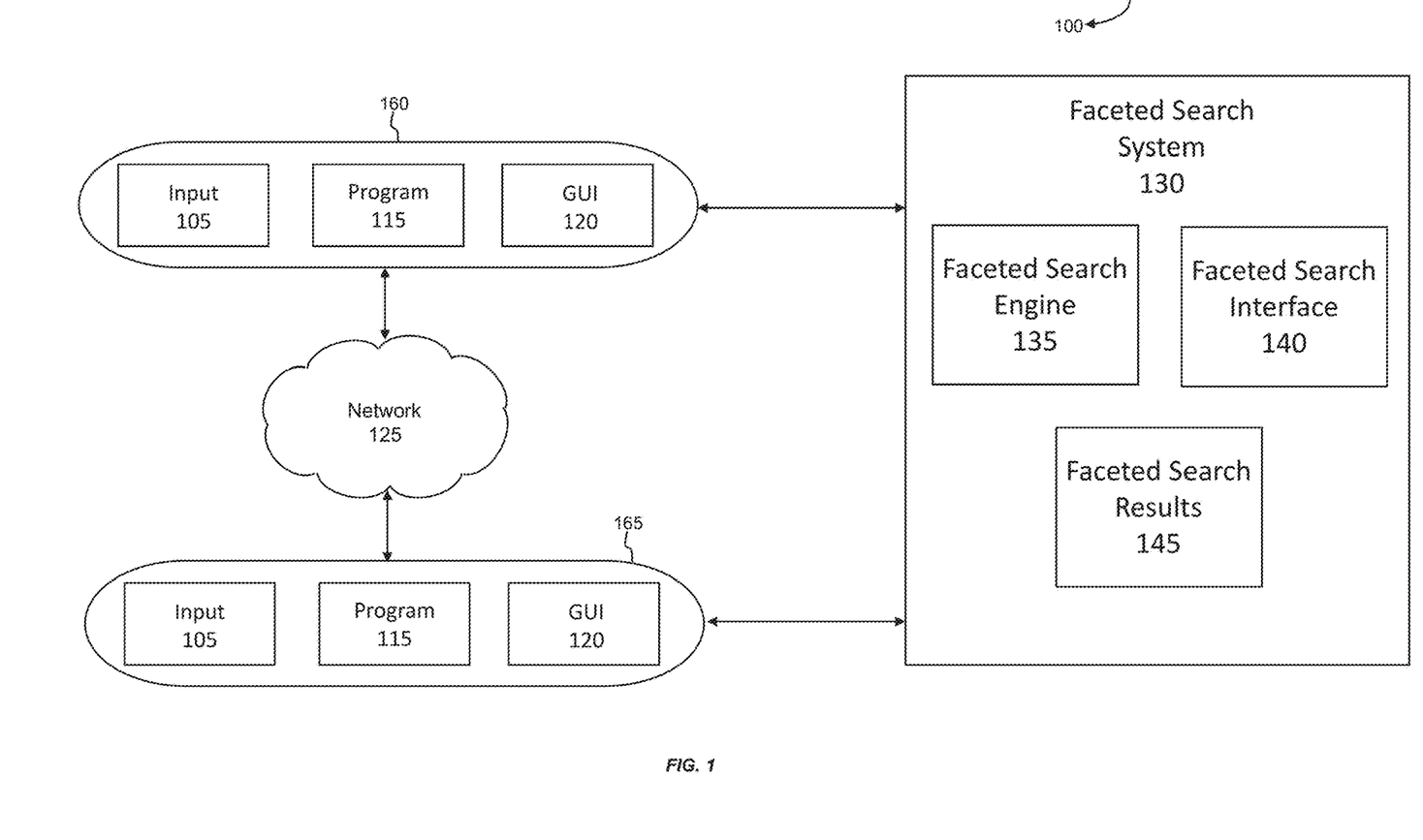
FIG. 1 illustrates a functional block diagram illustrating a data processing environment according to at least one embodiment.

Referring to FIG. 1, a data processing environment 100 in accordance with an exemplary embodiment is depicted. FIG. 1 provides only an illustration of implementation and does not imply any limitations regarding the environments in which different embodiments may be implemented. Modifications to data processing environment 100 may be made by those skilled in the art without departing from the scope of the invention as recited by the claims. In this exemplary embodiment, environment 100 includes a first end-user computing device 160, a second end-user computing device 165, components of a faceted search system 130 (including one or more servers)—faceted search engine 135, faceted search interface 140, and faceted search results 145, which are all connected via a network 125. The network 125 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

End-user computing devices 160 and 165 may communicate with the faceted search system 130 via the network 125. Network 125 may include connections, such as wire, wireless communication links, or fiber optic cables. The one or more servers may also operate in a cloud computing service model, such as Software as a Service (SaaS), Analytics as a Service (AaaS), Platform as a Service (PaaS), or Infrastructure as a Service (IaaS). The one or more servers may also be located in a cloud computing deployment model, such as a private cloud, community cloud, public cloud, or hybrid cloud. End-user computing devices 160 and 165 may be, for example, a mobile device, a telephone, a personal digital assistant, a netbook, a laptop computer, a tablet computer, a desktop computer, or any type of computing devices capable of running a program, accessing a network, and accessing one or more databases.

In certain embodiments, faceted search system 130 represent computer systems utilizing clustered computers and components to act as a single pool of seamless resources when accessed through network 125. For example, such embodiments may be used in data center, cloud computing, storage area network (SAN), and network attached storage (NAS) applications. In certain embodiments, end-user computing device 160 and end-user computing device 165 represent virtual machines. In general, end-user computing device 160 and end-user computing device 165 are representative of any electronic devices, or combination of electronic devices, capable of executing machine-readable program instructions, as described in greater detail with regard to FIG. 6.

End-user computing device 160 and end-user computing device 165 each include user input 105, program 115, and GUI 120. Input 105 may be data (e.g., information/contents contained within one or more queries) to be processed by the faceted search system 130, wherein the data is amenable for processing by program 115 (which is described in more detail below) and sent to GUI 120 via network 125. Input 105 is typically text data to be processed by faceted search system 130. GUI 120 may be for example, a graphical user interface (GUI) or a web user interface (WUI) and can display text, documents, web browser windows, user options, application interfaces, instructions for operation, and includes the information (such as graphics, text, and sound) a program presents to a user and the control sequences the user employs to control the program. GUI 120 is capable of receiving data, user commands, and data input modifications from a user and communicating with program 155. The end-users of computing devices 160 and 165 can view the contents deriving from the components of faceted search system 130 on GUI 120.

In some embodiments, one or more servers of faceted search system 130 are configured to monitor one or more interactions of computing devices 160 and 165 with data, activities, documents, users, or any other applicable entity/item in order to ascertain facets and facet values. It is to be understood that the presentation of faceted search results 145 via faceted search interface 140 may be based on one or more classification systems of faceted search system 130 configured to determine facets of relevance to users operating on computing devices 160 and 165 in addition to facets commonly associated with one or more components of faceted search results 145.

Figure 2:
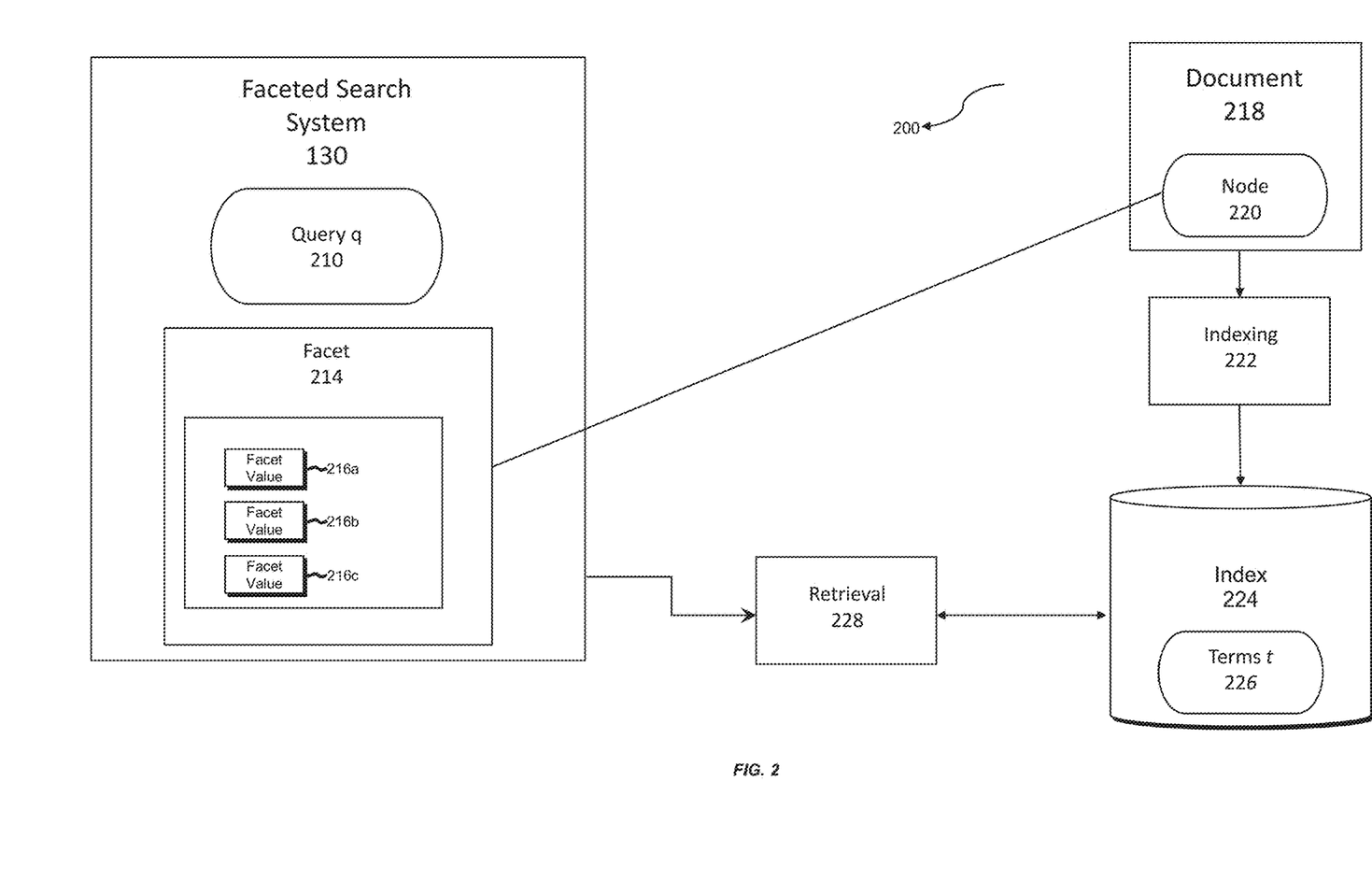
FIG. 2 illustrates a schematic depiction of a networked computer system on which embodiments of the invention may be implemented according to at least one embodiment.

Referring to FIG. 2, a block diagram of a content analysis system 200 is depicted according to an exemplary embodiment. In some embodiments, system 200 includes faceted search system 130 configured to include a query 210 including one or more terms (derived from a user of computing device 160 and/or 165), a facet 214 including facet values 216a-216c derived from one or more documents 218 (e.g., crawlable pages including HTML language), an indexing mechanism 222 configured to support functionality known to those of ordinary skill in the art such as weighing, mapping, tokenizing, etc., and a retrieval mechanism 228 configured to support keyword and semantic index retrieval in order to store facet 214 in an index 224 In some embodiments, query 210 includes one or more constraints (textual and/or navigational) on documents 218 sourced from computing device 160 and/or 165 provided by the applicable user via program 115. It is to be understood that search results of a search rendered by faceted search engine 135 is configured to be rendered in the form of one or more documents 218 organized in a facet tree including one or more facets; however, faceted search system 130 is configured to provide a runtime algorithm that evaluates query 210 allowing faceted search results 145 to be returned in a quick and efficient manner. In some embodiments, faceted search system 130 is configured to utilized a parser designed to search document 218 via Xpath (XML Path Language) and/or CSS selectors. Faceted search system 130 includes components configured to identify specific XML or XML-related content via locating a node 220 (or plurality of nodes) having a specific parent and/or specific attribute (e.g, class attribute value, expression, etc.) including a particular range of value.

Documents 218 may include or be available from web servers, binary data, a JavaScript file, a CSS file, HTML pages, a corpus of text, a combination thereof, or any other applicable data configured to be crawled/analyzed to obtain textual data. As described herein, facet 214 is a manifestation and/or representation of node 220 (if applicable, plurality of nodes) in the facet tree, and a facet may have any number of facet elements (or child facets). In some embodiments, the total number of records in a facet is the sum total of all records in the posting lists of the facet elements beneath the facet in the facet tree. Selection of a facet (a range, word, or phrase) causes faceted search results 145 to present the next set of facets, and so on along the facet tree until a final facet (the lowest-level categorization for a facet) is reached. In some embodiments, when the user operating on computing device 160 and/or 165 chooses node 220, facet values ("property instances") 216a-c associated with the selected facet node (e.g, node 220) are displayed on GUI 120 via program 115. Each facet value has a corresponding numerical value that correlates the relationship of the facet value to document 218. Examples of the numerical value include, but are not limited to, frequency and correlation.

In some embodiments, document 218 includes one or more files including but not limited to definition files configured to describe the relationship of nodes 220 and expressions using elements/attribute values associated with nodes 220. In some embodiments, retrieval mechanism 228 (alone or in combination with faceted search system 130) is designed and configured to dynamically collect a plurality of structural information pertaining to the one or more terms at the time faceted search engine 135 renders the faceted search associated with query 210. In some embodiments, the plurality of structural information includes information pertaining to term content, position/location of content within the applicable document, time, venue, static dimensions, metadata, or any other applicable data of the one or more terms within query q 210 and/or document 218. The one or more terms along with the plurality of structural information pertaining to the one or more terms are configured to be stored in index 224 as terms t 226 in which terms t 226 serve as one or more representations of facet 214. In some embodiments, terms t 226 may be arranged in index 224 based on relevancy, term frequency, weighted importance, or any other applicable means for arrangement.

In some embodiments, the plurality of structural information may be ascertained by faceted search system 130 and/or retrieval mechanism 228 via querying languages, style sheet languages, and/or any other applicable programming language. For example, Xpath is configured to provide syntax and semantics allowing the position of one or more portions of an XML document to be ascertained. In particular, Xpath enables the user to specify a position in an XML document via the hierarchical structure of a Document Object Model (DOM) tree of the XML document in addition to allows the user to test whether or not the nodes included in a DOM tree match a given pattern. In another example, CSS cascade processing is performed on the DOM tree allowing facet values 216a-c to be distinguished for each CSS class name of text elements in the original HTML text of document 218.

Figure 3:
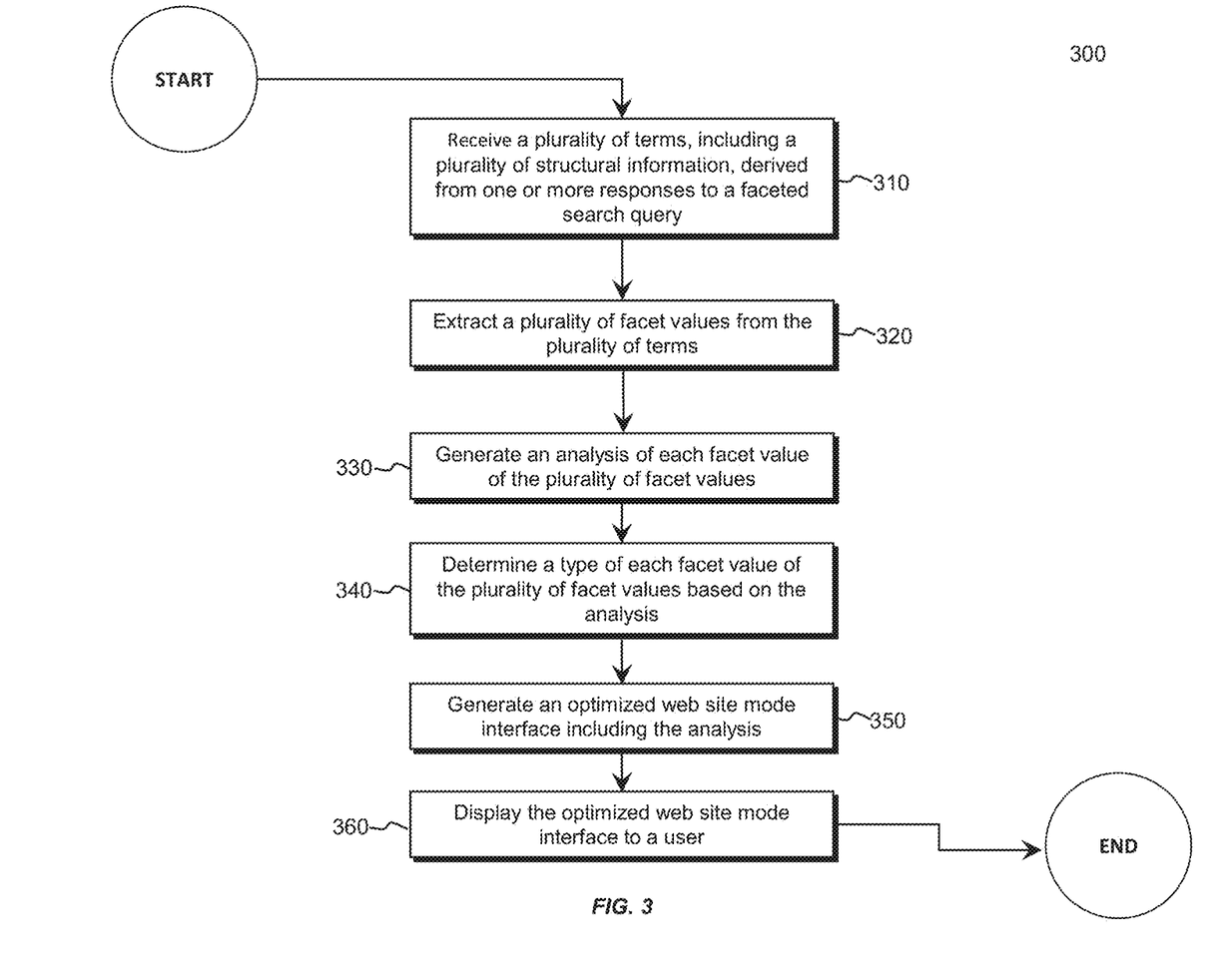
FIG. 3 illustrates a flowchart illustrating a process for analyzing a webpage content according to at least one embodiment.

Referring to FIG. 3, an operational flowchart illustrating a process for analyzing a webpage content 300 is depicted that may, according to at least one embodiment, be performed using system 200 and the various components shown in FIG. 1. System 200 may include various modules, user interfaces, services, and content analysis tools and may use data storage when process 300 is performed. In a step 310, the user transmits query 210 to faceted search system 130 via program 115 operating on computing device 160 or 165. It should be noted that system 200 (including one or more applicable servers) is designed and configured to generate one or more "web site" modes hosted via program 115 in which the type of "web site" mode presented to the user may be determined based upon the programming language utilized to render and/or assist faceted search system 130. For example, system 200 may support a "web site" mode specifically utilizing Xpath, a "web site" mode specifically utilizing CSS, and/or a "web site" mode utilizing both or neither. In some embodiments, upon query 210 being received, query 210 may be utilized by faceted search system 130 and its components to process nodes 220 in document 218 that match a specified criteria pertaining to query 210 and/or data received by system 200, or non-XML syntax to facilitate use of XPath within URIs and XML attribute values. In some embodiments, faceted search system 130 parses query 210 and converts query 210 into a query tree representation. Terms t 226 are extracted from query 210 along with the plurality of structural information of each term of terms t 226 within document 218.

In a step 320, retrieval mechanism 228 extracts facet values 216a-c from terms t 226. In some embodiments, facet 214, with assistance from indexing mechanism 222, is indexed in index 224 in order for faceted search system 130 to accurately calculate the statistical data for facet 214, in which the calculated value may be a concatenated value. In traditional instances along with instances where additional facets 214 are selected and/or added, calculation of facet values 216a-c renders a numerical value. In some embodiments, the numerical value derived from this extraction step may be a count/frequency value and a correlation value; however, in some embodiments, the correlation value is a component of the plurality of structural information associated with terms t 226. The frequency value may be directed at a count of documents 218 in the collection with the subject facet value, and the correlation may be a ratio of an expected number of documents in the corpus with the facet value. The correlation helps faceted search system 130 identify significant facet values. The numerical value can also be a combination of the facet value in addition to the CSS class name or the facet value in addition to the Xpath expression. In some embodiments, the content of each term of terms t 226 is collected along the with the count value and/or the correlation value. The purpose of this feature is to not only assist faceted search system 130 with the textual analysis of document 218, but also to assist with distinguishing facet values within text elements of document 218 to avoid undesired text.

In a step 330, program 115, with assistance from faceted search system 130, performs one or more analyses of facet values 216a-c. It is to be noted that the purpose of analyzing facet values 216a-c is to distinguish facet values 216a-c from each other based on one or more of the position derived from the facet, associated Xpath expressions, associated CSS class names, and/or combination thereof associated with facet values 216a-c. The one or more servers iterate over documents 218 for the purpose of detection, wherein documents 218 are loaded into the DOM for traversal. The Xpath expressions may be utilized to obtain nodes 220 for each facet value and be utilized to distinguish facet values 216a-c from each other. For example, faceted search system 130 and its components may be configured to acquire one or more text nodes from a source node within a source DOM tree specified via the Xpath. Faceted search system 130 and its components may be further be configured to map the text nodes to the corresponding node in a destination DOM tree. In some embodiments, the nodes of the Xpath expressions associated with query 210 correspond to one or more location paths allowing descendant nodes (e.g., leaf nodes) that correspond to the location paths to have a common element or attribute. In a first preferred embodiment, faceted search system 130 inspects the Xpath expression of a parent node of the one or more text nodes. In a second preferred embodiment, faceted search system 130 inspects a class attribute value of a parent node of the one or more text nodes. It is to be noted that it is possible for facet values 216a-c to include the same characters; however, this does not prevent facet values 216a-c from being distinguishable upon discovery of the class attribute value of the applicable text node.

In a step 340, faceted search system 130 and its components determine the type of facet values 216a-c based on the one or more analyses of facet values 216a-c. It is to be noted that faceted search system 130 seeks to distinguish between facet values 216a-c and determine a type for them in order to distinguish between desired text and undesired text within document 218. In a preferred embodiment, the type of facet values 216a-c is determined based on an inspection or reference to the parent node of the one or more applicable text nodes in which faceted search system 130 searches for a discrepancy between class attribute values and/or Xpath expressions. For example, upon reference to the class attribute value of the parent node of the applicable text node (associated with facet value 216a), faceted search system 130 and its components may determine that facet value 216b is not equivalent to facet value 216a because facet value 216b has a different class attribute value from facet value 216a. In this instance, the type of facet value 216a is classified as desired and the type of facet value 216b is classified as undesired. As a result, facet value 216b and its associated data is disregarded and not included in the calculation of count and/or correlation value. In another example, upon inspection to the Xpath expression of the parent node of the applicable text node (associated with facet value 216a), faceted search system 130 and its components may determine that facet value 216c is not equivalent to facet value 216a because facet value 216c has a different Xpath expression from facet value 216a. In this instance, the type of facet value 216a is classified as desired and the type of facet value 216c is classified as undesired. As a result, facet value 216c and its associated data is disregarded and not included in the calculation of count and/or correlation value. In some embodiments, facet values 216b-c may be still be presented to the user for textual analytics purposes via program 115 despite facet values 216b-c not being included in calculations. As previously mentioned, the one or more analyses of facet values 216a-c may result in a new facet value, wherein the new facet value includes a concatenating value (i.e., FacetValue+className or FacetValue+XPathExpression). It is to be noted that the one or more analyses of facet values 216a-c may be used to render faceted search results 145 in a quicker manner by the one or more servers supplementing syntax of query 210 with one or more aggregations of data derived from the one or more analyses.

In a step 350, program 115 is configured to generate the applicable "web site" mode for presentation on computing device 160 and/or 165 via GUI 120. It is to be noted that the selection of the applicable "web site" mode is subject to the preferences of the user operating on computing device 160 and/or 165, and the mode is intended to provide optimized textual analytics to the user. In some embodiments, program 115 generates a "normal web site" mode configured to provide displays via GUI 120 including one or more text analyses for flat texts. In another embodiment, program 115 generates a "CSS web site" mode configured to provide displays via GUI 120 including the desired facet values of facet values 216a-c for each CSS class name of text elements within document 218. In yet another embodiment, program 115 generates a "Xpath web site" mode configured to provide displays via GUI 120 including the desired facet values of facet values 216a-c based on Xpath expressions within document 218. In some embodiments, the aforementioned generated modes include presentation of not only count/frequency and correlation value of terms t 226 within document 218, but also analytics associated with distinctions between the metrics (e.g., count, correlation, etc.), analyses (portions/percentages of undesired text), and computing time/resource requirements associated with the one or more analyses specific to the generated modes.

Figure 4:
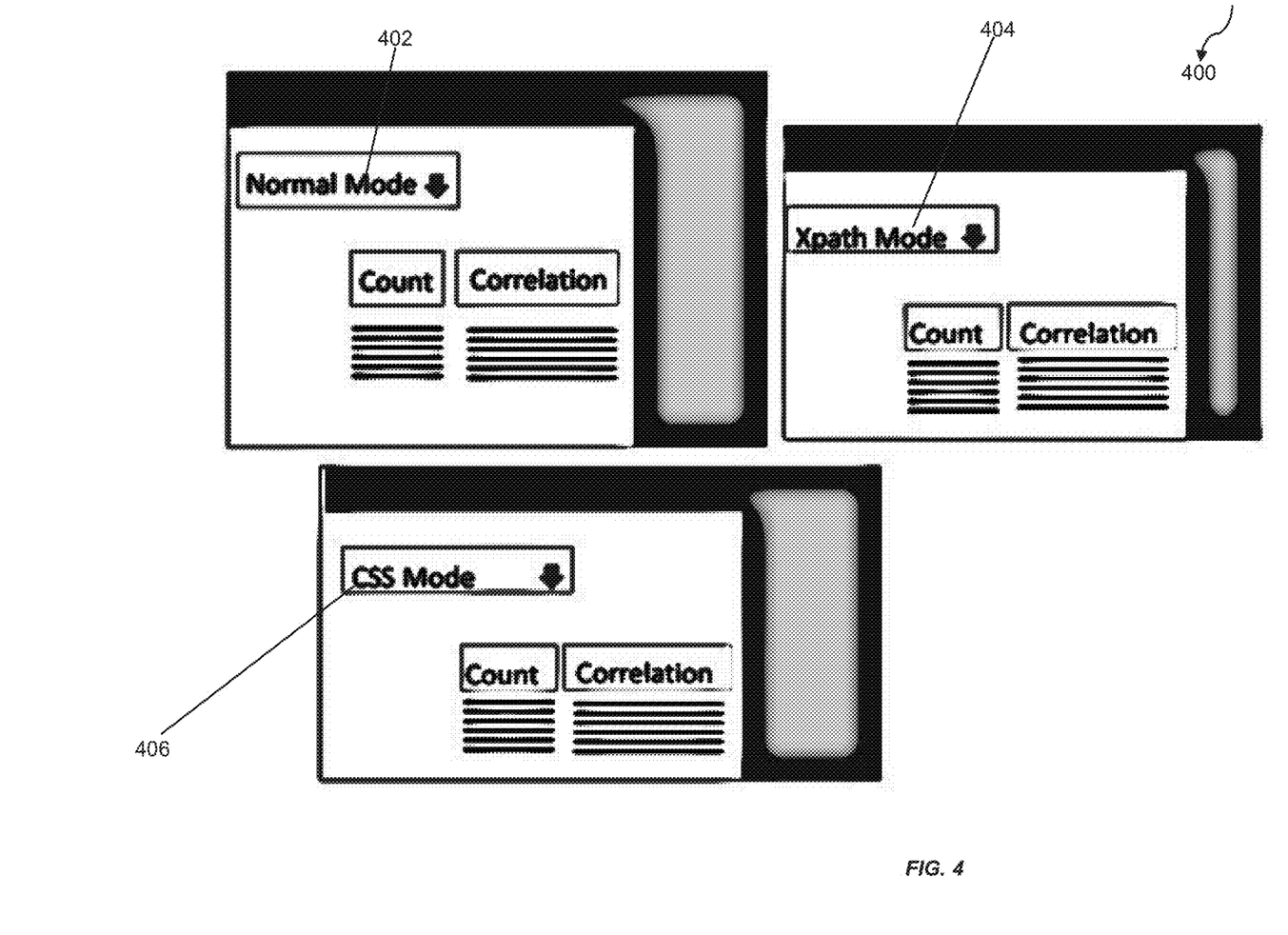
FIG. 4 illustrates exemplary user interfaces of implementations of embodiments of the invention according to at least one embodiment.

In a step 360, program 115 presents one or more displays of the applicable "web site" mode to the user via GUI 120. In some embodiments, facet values 216a-c are displayed to the user; however, the class attribute value (class) and/or Xpath expression associated with the applicable facet value may be displayed as well depending on the presented mode. FIG. 4 depicts a plurality of web site modes 400 including facet values, correlation values, and other applicable data ascertained via the one or more analyses generated by program 115, according to an exemplary embodiment. For example, a "normal web site" mode 402 is depicted including the count/frequency of terms t 226 within document 218. A "Xpath mode web site" mode 404 is depicted including the count/frequency of terms t 226 within document 218 along with the applicable correlation value, and a "CSS mode web site" mode 406 is depicted including the count/frequency of terms t 226 within document 218 along with the applicable correlation value.

Figure 5:
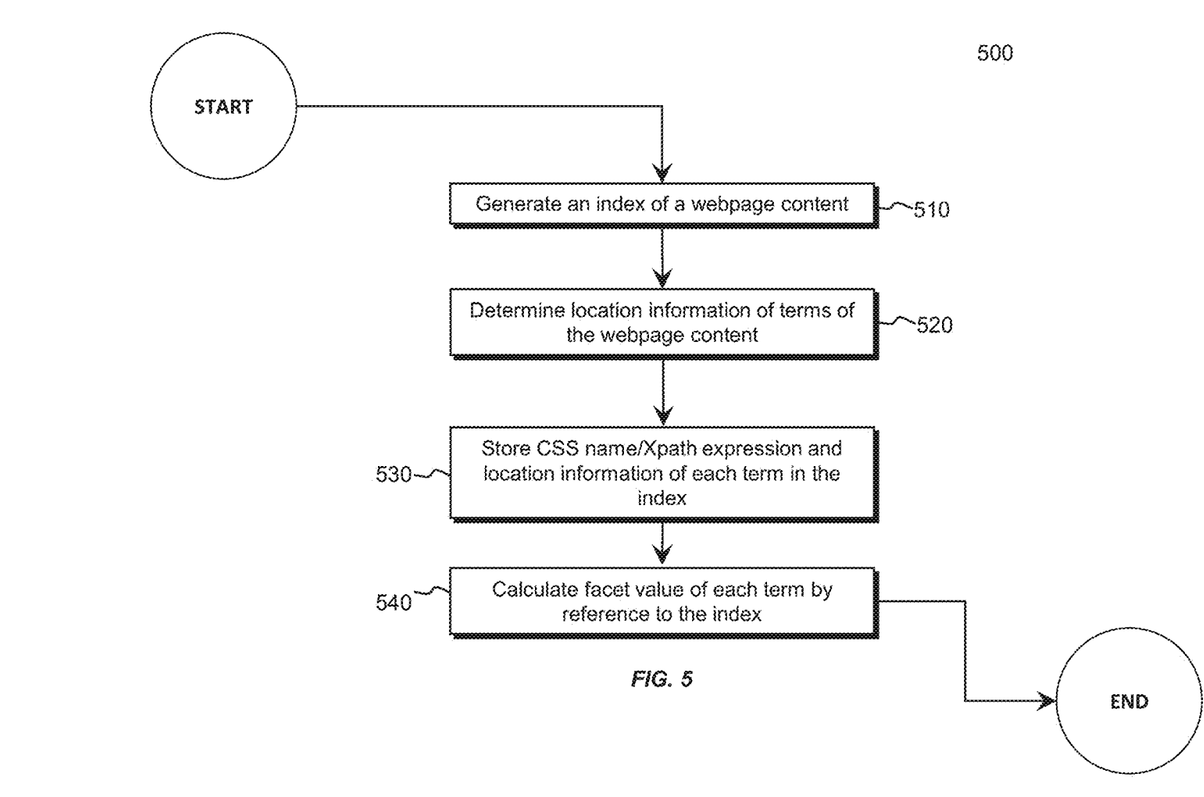
FIG. 5 illustrates a flowchart illustrating a process for storage and retrieval of facet values according to at least one embodiment.

Referring to FIG. 5, an operational flowchart illustrating a process for storage and retrieval of facet values 500 is depicted that may, according to at least one embodiment, be performed using system 200 and the various components shown in FIG. 1. In a step 510, faceted search system 130 generates index 224 of data derived from query 210 and/or iteration of documents 218. In some embodiments, index 224 may be a component of a logical data mapping of a semantic data model configured to utilize one or more subject areas, relevance functions, topics, attributes/features of terms t 226, or any other applicable basis for grouping/ranking/ordering within data structures know those of ordinary skill in the art. In some embodiments, index 224 is a retrieval index configured to be generated for a plurality of languages (e.g., Xpath, CSS, etc.); however, it is to be noted that index 224 may be generated in a manner in which it is a suitable data structure tailored to prevent dynamic searching of CSS and Xpath expressions of facet value 216a-c.

In a step 520, during the step of extracting facet values 216a-216c, data including CSS names, Xpath expressions, and position/location information for each term of terms t 226 is collected. It is to be noted that as CSS names and Xpath expressions are collected they may be evaluated relative to the context of node 220 based on the position/location of node 220 within document 218. In some embodiments, the CSS names, Xpath expressions, and position/location information for terms t 226 are stored in index 224 at a location based on a concatenating key of the term configured to include one or more references to the subtrees including the term along with the count value. Although concatenating keys are described, it should be understood that any reference to a storage location may be used.

In a step 530, the ascertainable location/position of each term in combination with the CSS names and/or Xpath expressions is stored in index 224 for subsequent retrieval by retrieval mechanism 228. The purpose of this method of storing is to reduce the amount of time needed to retrieve CSS names and/or Xpath expressions associated with facet values 216a-216c that would otherwise be required in order to dynamically search for the CSS names and/or Xpath expressions of facet values 216a-216c. By storing the locations of CSS names and/or Xpath expressions, retrieval mechanism 228 is able to reference the concatenating key values within index 224 to retrieve faceted search results 145 from index 224 at an unprecedented speed.

In a step 540, faceted search system 130 calculates facet values 216a-216c of facet 214 by retrieval mechanism 228 referencing index 224. Due to the inherent time requirement and computing resources ordinarily required in order to access elements nested in hierarchical documents and queries including long paths of elements, retrieval mechanism 228 preserves computing time and resources by calculating facet values 216a-216c of each term of terms t 226 by referencing the stored locations within index 224, wherein the facet values may include the facet value in addition to the className or the facet value in addition to the XPathExpression.

Figure 6:
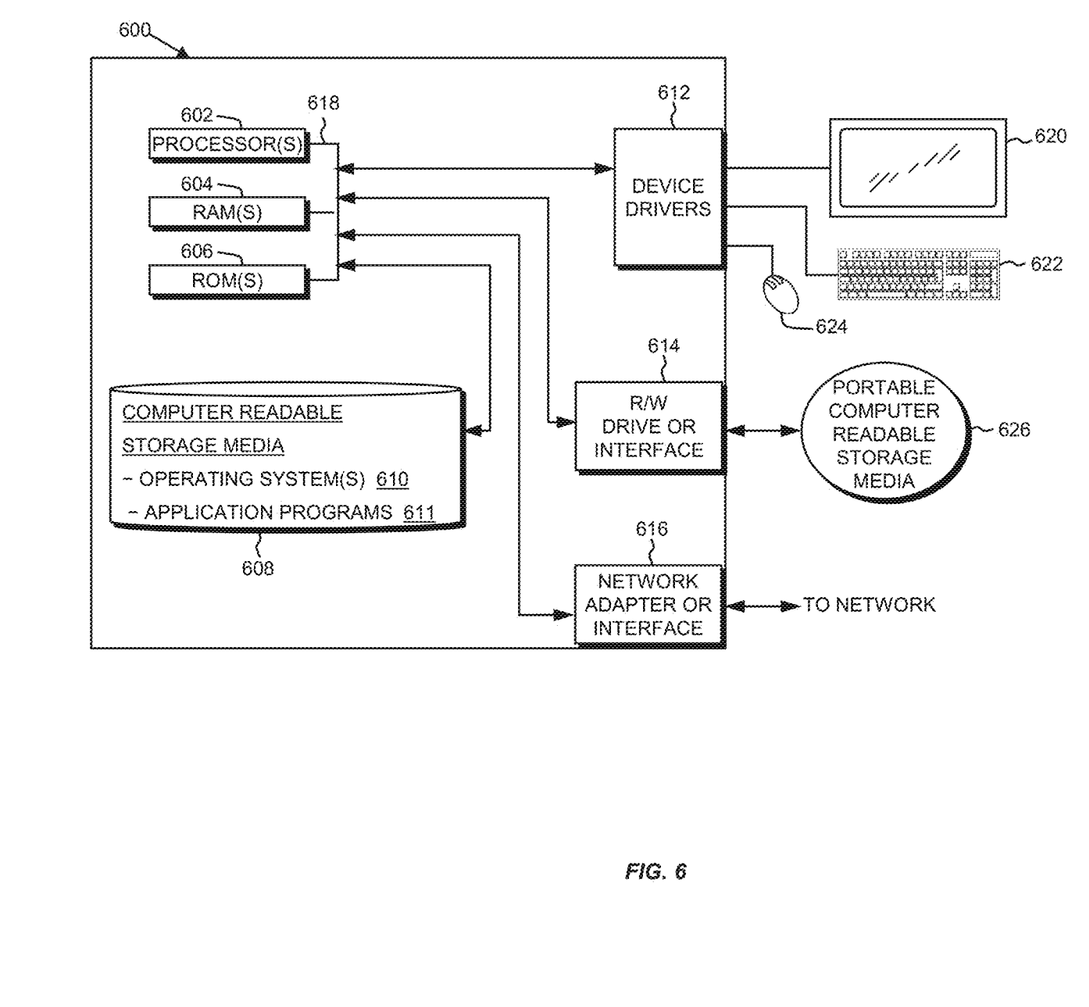
FIG. 6 depicts a block diagram illustrating components of the software application of FIG. 1, in accordance with an embodiment of the invention.

FIG. 6 is a block diagram of components 600 of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing environment 600 is representative of any electronic device capable of executing machine-readable program instructions. Data processing environment 600 may be representative of a smart phone, a computer system, PDA, or other electronic devices. Examples of computing systems, environments, and/or configurations that may be represented by data processing system 600 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The one or more servers may include respective sets of components illustrated in FIG. 6. Each of the sets of components include one or more processors 602, one or more computer-readable RAMs 604 and one or more computer-readable ROMs 606 on one or more buses 618, and one or more operating systems 610 and one or more computer-readable tangible storage devices 616. The one or more operating systems 610, program 115, and the faceted search system 130, may be stored on one or more computer-readable tangible storage devices 608 for execution by one or more processors 602 via one or more RAMs 604 (which typically include cache memory). In the embodiment illustrated in FIG. 6, each of the computer-readable tangible storage devices 626 is a magnetic disk storage device of an internal hard drive. Alternatively, each of the computer-readable tangible storage devices 626 is a semiconductor storage device such as ROM 606, EPROM, flash memory or any other computer-readable tangible storage device that can store a computer program and digital information.

Each set of components in environment 600 also includes a R/W drive or interface 614 to read from and write to one or more portable computer-readable tangible storage devices 608 such as a CD-ROM, DVD, memory stick, magnetic tape, magnetic disk, optical disk or semiconductor storage device. A software program, such as program 115 can be stored on one or more of the respective portable computer-readable tangible storage devices 608, read via the respective R/W drive or interface 614 and loaded into the respective hard drive.

Each set of components of environment 600 may also include network adapters (or switch port cards) or interfaces 616 such as a TCP/IP adapter cards, wireless wi-fi interface cards, or 3G or 4G wireless interface cards or other wired or wireless communication links. Program 115 can be downloaded from an external computer (e.g., server) via a network (for example, the Internet, a local area network or other, wide area network) and respective network adapters or interfaces 616. From the network adapters (or switch port adaptors) or interfaces 616, program 115 is loaded into the respective hard drive. The network may comprise copper wires, optical fibers, wireless transmission, routers, firewalls, switches, gateway computers and/or edge servers.

Each component of environment 600 can include a computer display monitor 620, a keyboard 622, and a computer mouse 624. Components of environment 600 can also include touch screens, virtual keyboards, touch pads, pointing devices, and other human interface devices. Each of the sets of components of environment 600 also includes device processors 602 to interface to computer display monitor 620, keyboard 622 and computer mouse 624. The device drivers 612, R/W drive or interface 614 and network adapter or interface 616 comprise hardware and software (stored in storage device 608 and/or ROM 606).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
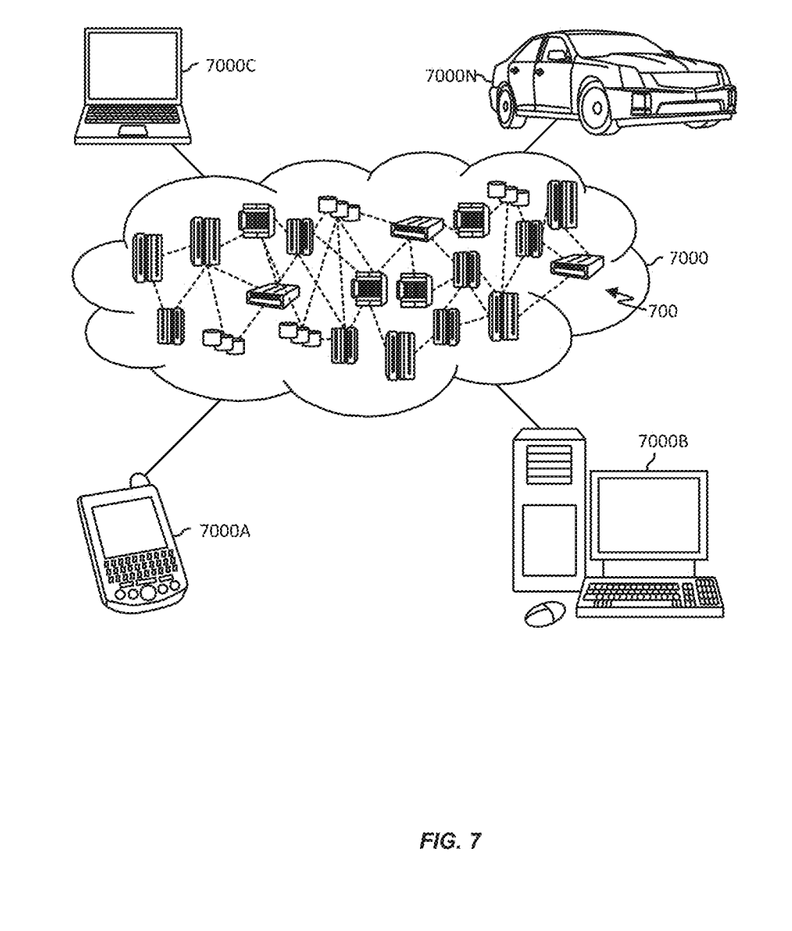
FIG. 7 depicts a cloud-computing environment, in accordance with an embodiment of the present invention

Referring now to FIG. 7, illustrative cloud computing environment 700 is depicted. As shown, cloud computing environment 700 comprises one or more cloud computing nodes 7000 with which local computing devices used by cloud consumers, such as, for example, personal digital assistant (PDA) or cellular telephone 7000A, desktop computer 7000B, laptop computer 7000C, and/or automobile computer system 7000N may communicate. Nodes 7000 may communicate with one another. They may be grouped (not shown) physically or virtually, in one or more networks, such as Private, Community, Public, or Hybrid clouds as described hereinabove, or a combination thereof. This allows cloud computing environment 7000 to offer infrastructure, platforms and/or software as services for which a cloud consumer does not need to maintain resources on a local computing device. It is understood that the types of computing devices 7000A-N shown in FIG. 7 are intended to be illustrative only and that computing nodes 7000 and cloud computing environment 700 can communicate with any type of computerized device over any type of network and/or network addressable connection (e.g., using a web browser).

Figure 8:
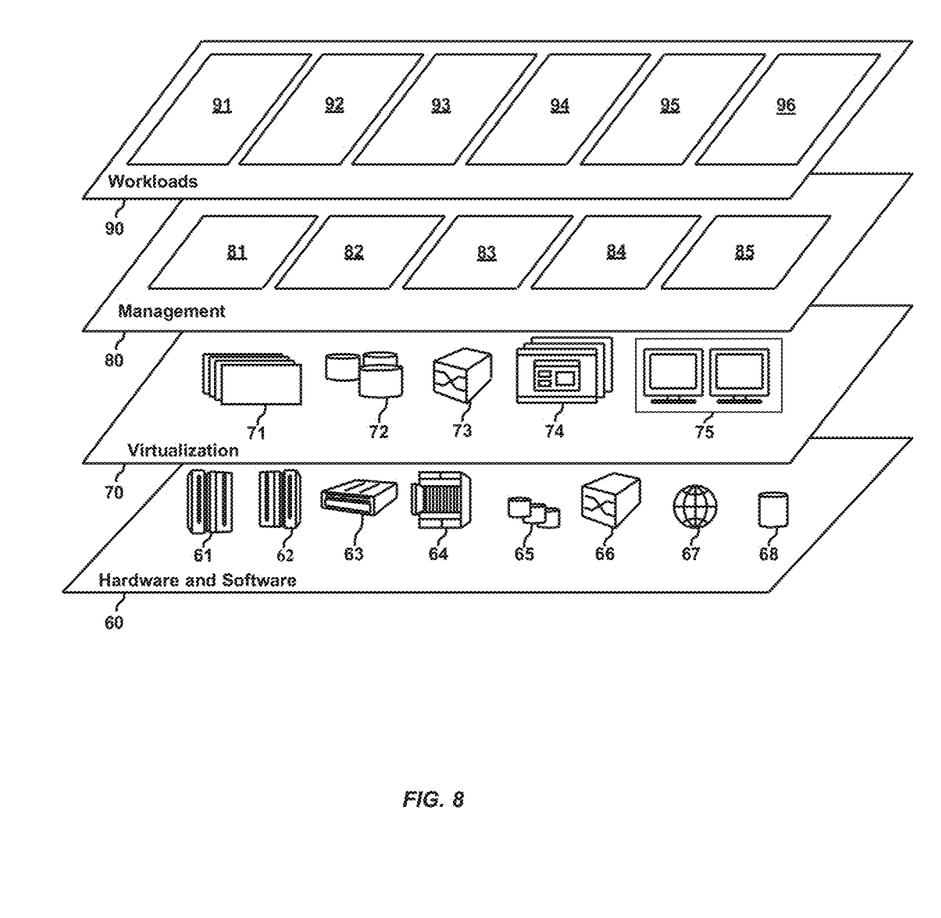
FIG. 8 depicts abstraction model layers, in accordance with an embodiment of the present invention.

Referring now to FIG. 8 a set of functional abstraction layers provided by cloud computing environment 700 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer-implemented method for analyzing a webpage content, the method comprising:
receiving, via a computer, a plurality of terms, including a plurality of structural information, derived from one or more responses to a faceted search query, wherein the plurality of structural information includes a position and a correlation value of each term of the plurality of terms in the webpage content;
extracting, via the computer, a plurality of facet values from the plurality of terms;
generating, via the computer, an analysis of each facet value of the plurality of facet values;
determining, via the computer, a type of each facet value of the plurality of facet values based on the analysis;
based on the determined type, presenting, via the computer, the plurality of structural information;
generating, via the computer, an index of the webpage content; and
storing, via the computer, a CSS name and a Xpath expression for each term of the plurality of terms in the index.

2. The computer-implemented method according to claim 1, further comprising:
generating, via the computer, an optimized web site mode interface including the analysis; and
displaying, via the computer, the optimized web site mode interface to a user.

3. The computer-implemented method according to claim 1, wherein the correlation value is associated with identifying significant facet values of each term of the plurality of terms in the webpage content.

4. The computer-implemented method according to claim 3, wherein the extraction of each facet value includes collecting a content of each term of the plurality of terms and a count of webpage content including the term including the correlation value.

5. The computer-implemented method according to claim 1, wherein generating the analysis is based on the plurality of structural information associated with the term.

6. The computer-implemented method according to claim 1, wherein the plurality of structural information is collected dynamically at the time of a faceted search associated with the faceted search query.

7. The computer-implemented method according to claim 1, wherein determining the type of each facet value comprises:
detecting, via the computer, a first class attribute value for each facet value of the plurality facet values;
detecting, via the computer, a second class attribute value for each facet value of the plurality facet values; and
classifying, via the computer, the type of the facet value based on the first class attribute value not being equal to the second class attribute value.

8. The computer-implemented method according to claim 1, wherein determining the type of each facet value comprises:
detecting, via the computer, a first Xpath expression for each facet value of the plurality facet values;
detecting, via the computer, a second Xpath expression for each facet value of the plurality facet values; and
classifying, via the computer, the type of the facet value based on the first Xpath expression not being equal to the second Xpath expression.

9. A computer system for analyzing a webpage content, the computer system comprising:
one or more processors, one or more computer-readable memories, and program instructions stored on at least one of the one or more computer-readable memories for execution by at least one of the one or more processors to cause the computer system to:
program instructions to receive a plurality of terms, including a plurality of structural information, derived from one or more responses to a faceted search query, wherein the plurality of structural information includes a position and a correlation value of each term of the plurality of terms in the webpage content;
program instructions to extract a plurality of facet values from the plurality of terms;
program instructions to generate an analysis of each facet value of the plurality of facet values;
program instructions to determine a type of each facet value of the plurality of facet values based on the analysis;
program instructions to generate an optimized web site mode interface including the analysis;
program instructions to display the optimized web site mode interface to a user based on the determined type;
program instructions to generate an index of the webpage content; and
program instructions to store a CSS name and a Xpath expression for each term of the plurality of terms in the index.

10. The computer system of claim 9, wherein the program instructions to detect a first class attribute value for each facet value of the plurality facet values; detect a second class attribute value for each facet value of the plurality facet values; and classify the type of the facet value based on the first class attribute value not being equal to the second class attribute value.

11. The computer system of claim 9, wherein the program instructions to detect a first Xpath expression for each facet value of the plurality facet values; detect a second Xpath expression for each facet value of the plurality facet values; and classify the type of the facet value based on the first Xpath expression not being equal to the second Xpath expression.

12. A computer program product using a computing device to analyze a webpage content, the computer program product comprising:
one or more non-transitory computer-readable storage media and program instructions stored on the one or more non-transitory computer-readable storage media, the program instructions, when executed by the computing device, cause the computing device to perform a method comprising:
receiving by a computing device a plurality of terms, including a plurality of structural information, derived from one or more responses to a faceted search query, wherein the plurality of structural information includes a position and a correlation value of each term of the plurality of terms in the webpage content;
extracting by a computing device a plurality of facet values from the plurality of terms;
generating by the computing device an analysis of each facet value of the plurality of facet values;
determining by the computing device a type of each facet value of the plurality of facet values based on the analysis;
based on the determined type, presenting, by the computing device, the plurality of structural information;
generating an index of the webpage content; and
storing a CSS name and a Xpath expression for each term of the plurality of terms in the index.

13. The computer program product of claim 12, further comprising generating by a computing device an optimized web site mode interface including the analysis; and displaying by a computing device the optimized web site mode interface to a user.

14. The computer program product of claim 12, wherein the correlation value is associated with identifying significant facet values of each term of the plurality of terms in the webpage content.

15. The computer program product of claim 12, wherein the extraction of each facet value includes collecting a content of each term of the plurality of terms and a count of webpage content including the term including the correlation value.

16. The computer program product of claim 12, wherein the analysis is based on the plurality of structural information associated with the term.

17. The computer program product of claim 12, wherein the plurality of structural information is collected dynamically at the time of a faceted search associated with the faceted search query.

18. The computer program product of claim 12, wherein determining by the computing device the type of each facet value comprises detecting a first class attribute value for each facet value of the plurality facet values; detecting a second class attribute value for each facet value of the plurality facet values; and classifying the type of the facet value based on the first class attribute value not being equal to the second class attribute value.

19. The computer program product of claim 12, wherein determining by the computing device the type of each facet value comprises detecting a first Xpath expression for each facet value of the plurality facet values; detecting a second Xpath expression for each facet value of the plurality facet values; and classifying the type of the facet value based on the first Xpath expression not being equal to the second Xpath expression.

* * * * *